June 11, 1929.　　G. E. CHAMBERLAIN　　1,716,876
GRAIN DRIER
Filed Feb. 17, 1926　　3 Sheets-Sheet 1

Inventor
George E. Chamberlain
By Nissen & Crane
Attys.

June 11, 1929.  G. E. CHAMBERLAIN  1,716,876
GRAIN DRIER
Filed Feb. 17, 1926    3 Sheets-Sheet 2

Inventor
George E. Chamberlain
By Nissen & Crane attys.

June 11, 1929.	G. E. CHAMBERLAIN	1,716,876
GRAIN DRIER
Filed Feb. 17, 1926	3 Sheets-Sheet 3
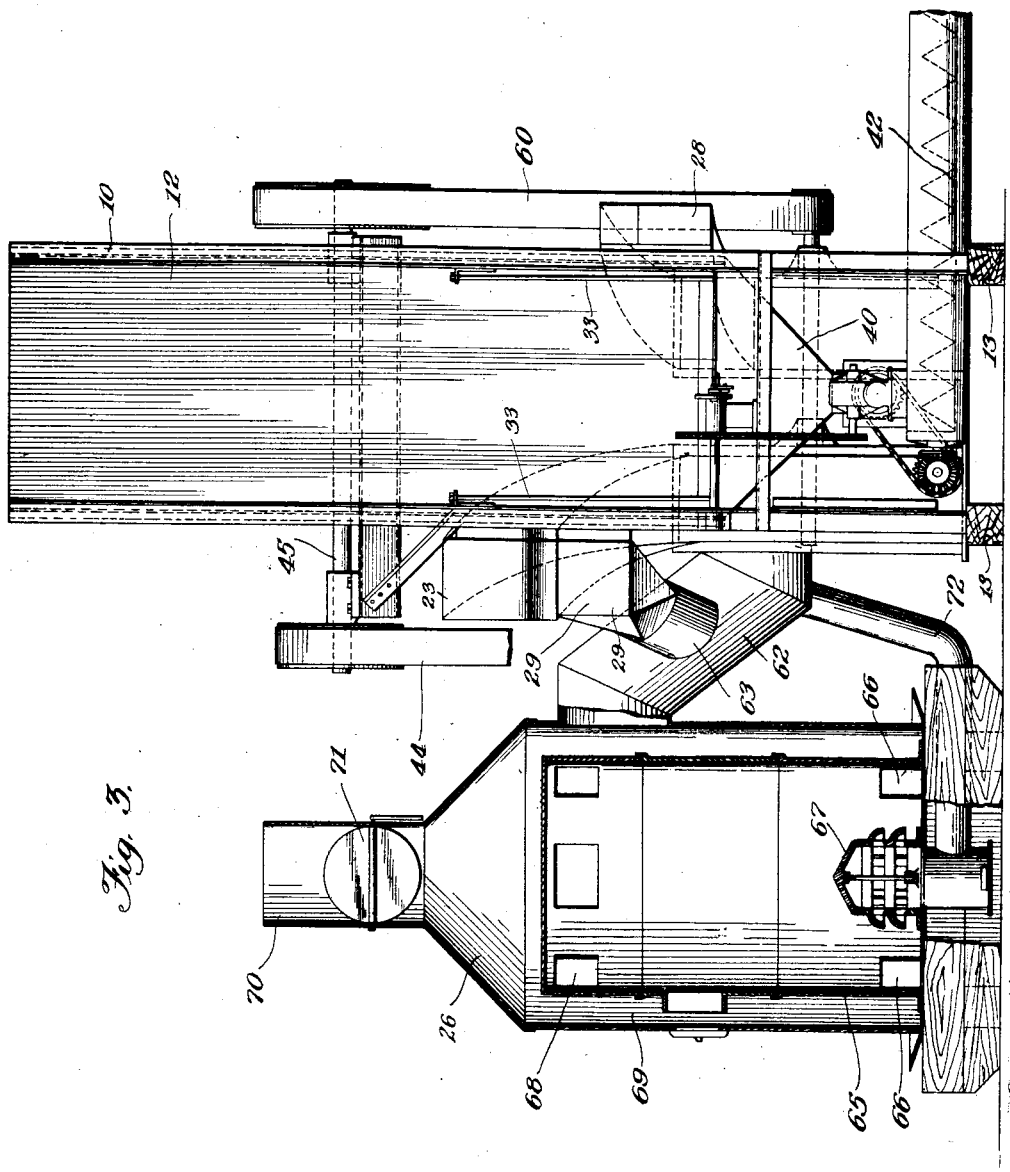

Patented June 11, 1929.

1,716,876

UNITED STATES PATENT OFFICE.

GEORGE E. CHAMBERLAIN, OF DECATUR, ILLINOIS; ELIZABETH G. CHAMBERLAIN EXECUTRIX OF THE ESTATE OF GEORGE E. CHAMBERLAIN, DECEASED.

GRAIN DRIER.

Application filed February 17, 1926. Serial No. 88,731.

This invention relates to a device for removing excess moisture from loose grain, such as wheat, oats, shell corn, or other granular material. The invention has for its object the provision of a grain drier which shall be of improved construction and efficient and economical in operation.

The invention is exemplified in the combination and arrangement of parts shown in the accompanying drawings and described in the following specification, and it is more particularly pointed out in the appended claims.

In the drawings—

Figure 3 is an end elevation of the mechanism shown in Figure 1, with parts omitted and other parts shown in section.

Figure 1:
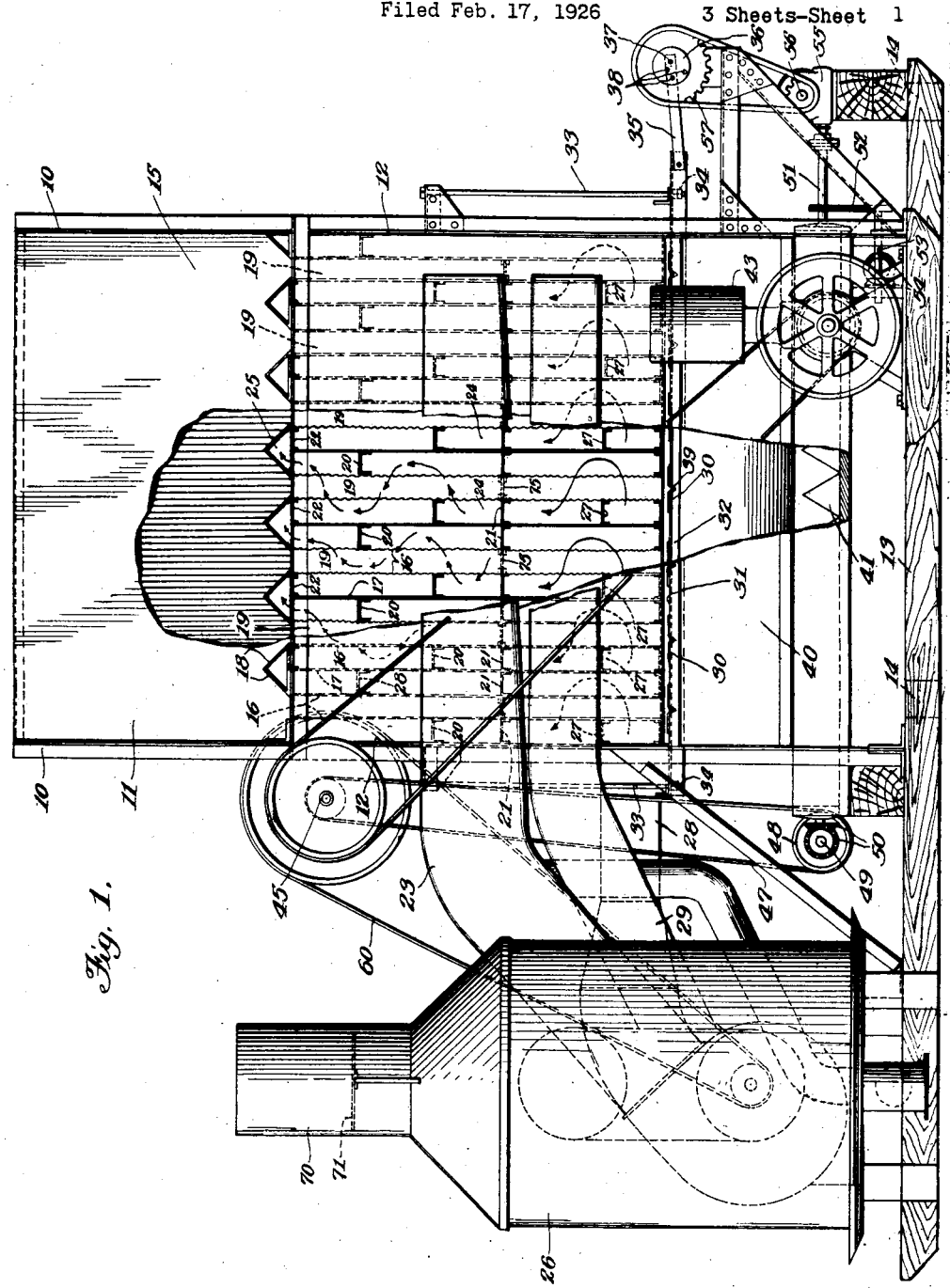
Figure 1 is a side elevation of a grain drier showing one embodiment of the present invention.

The drier comprises a main frame having corner posts 10, side walls 11 and end walls 12. The corner post 10 rests on skids 13 secured together by cross members 14. The upper portion 15 of the compartment surrounded by the walls 11 and 12 constitutes a hopper for receiving the grain to be dried. Below the hopper 15 is a series of partition walls 16 of screen wire or other reticulated material of sufficiently fine mesh to prevent the passage of grain therethrough. Alternate spaces between the screens 16 are divided by vertical walls 17 of solid sheet metal. Inclined plates 18 cover the alternate spaces between the screens, leaving the uncovered spaces 19 open for receiving the grain from the hopper 15. Baffles 20 are arranged in the covered spaces adjacent the partition walls 17, the baffles being staggered vertically, as shown in Figure 1 of the drawings. Floor plates 21 are arranged in the spaces adjacent the partition walls 17 and a cover plate 22 is provided at the top of one of the spaces adjacent each of the partition walls 17. An air duct 23 extends along one side of the drier and is provided with passageways 24 which communicate with the spaces between the floor plates 21 and the lower baffles 20. The arrangement described provides grain spaces 19 having air spaces at each side, the grain spaces being separated from the adjacent air spaces by the perforated walls 16. Air entering from the passages 24 will be intercepted by the lower baffles 21 and constrained to pass through the wall of grain to the air spaces at the opposite side thereof, as indicated by the arrows in Figure 1. The rising air will then encounter the upper baffles and again be deflected through the wall of grain into the space above the baffles first encountered. This space, being closed at its top by the top plate 22, will force the air to return through the wall of grain for the third time and enter the space 25 beneath the inclined covers 18. This space is open at its ends through the side walls of the hopper 15 to permit the escape of the air to the atmosphere. The air is prevented from rising directly through the wall of grain because of the large amount of grain which would have to be penetrated before the air could escape at the top. Hot air is supplied to the duct 23 from a heater 26. Alternate air spaces below the floor plates 21 are provided with baffles 27 and cold air is supplied to the spaces below the baffles from a cold air duct 28. This air escapes from the spaces above the baffles into a return duct 29. Before escaping, however, the air is constrained by the baffles and cover plates 21 to pass twice through the walls of grain in the grain spaces 19, as indicated by arrows in Figure 1. The grain is slowly displaced from the lower ends of the spaces 19 so that a continuously descending wall of grain is maintained in these spaces. As it descends, it is first dried by the air from the hot air duct 23. It then passes downwardly and is cooled by the air from the cold air duct 28. A series of plates 30 are disposed one beneath each of the grain spaces 19, forming a platform having openings 31 alternating with the plates 30. The plates 30 are supported on a framework 32 carried by suspension rods 33. The plates 30 are spaced downwardly from the lower ends of the grain spaces 19 and the height of the plates 30 may be regulated by adjustable nuts 34 on the rods 33. The plates 30 are reciprocated by means of a connecting rod 35 and a rotating disc 36 to which the connecting rod is secured by a crank pin 37. The disc 36 may be provided with a plurality of sockets 38 at different radial distances from the center of the disc for receiving the crank pin 37. By changing the position of the crank pin, the throw of the connecting rod 35 may be varied to change the amount of the reciprocation of the plates 30. Any other suitable adjustment may be provided for changing the effective radius of the crank arm. The plates 30 are preferably provided with grooves 39 for collecting a quantity of grain to impart a certain degree of friction between the plates and the grain column. The reciprocation of the plates will, of course, gradually displace the grain from the lower ends of the grain columns to cause a gradual descent of the grain in the spaces 19. The rate of movement of the grain may be varied by changing the length of stroke of the connecting rod 35 and by adjusting the height of the platform 32. A hopper 40 is provided beneath the reciprocating platform 32 to receive the grain therefrom, and the sides of this hopper are inclined inwardly, as shown in Figure 3, for directing the descending grain to a screw conveyer 41, extending longitudinally of the hopper. The conveyer 41 discharges to a transverse screw conveyer 42 which transfers the grain to any suitable position for storage, or other disposition thereof.

The apparatus is driven by a suitable motor 43 connected by a belt 44 to a drive shaft 45 at the top of the drying chamber. The drive shaft 45 is provided with a sprocket wheel 46 connected by a chain 47 with a sprocket wheel 48 on a shaft 49. The shaft 49 is connected by beveled gears 50 with the screw conveyer 41. The shaft 51 of the screw conveyer 41 is connected by a sprocket chain 52 with a shaft 53 which is geared by beveled gears 54 to the screw conveyer 42. The end of the shaft 51 is connected by worm gearing disposed in a gear casing 55 with a shaft 56. The shaft 56 is connected by a sprocket wheel 57 with the disc 36 which operates the connecting rod 35. It will be noted that the worm gearing reduces the speed to provide a slow movement of the reciprocating frame 32.

Figure 2:
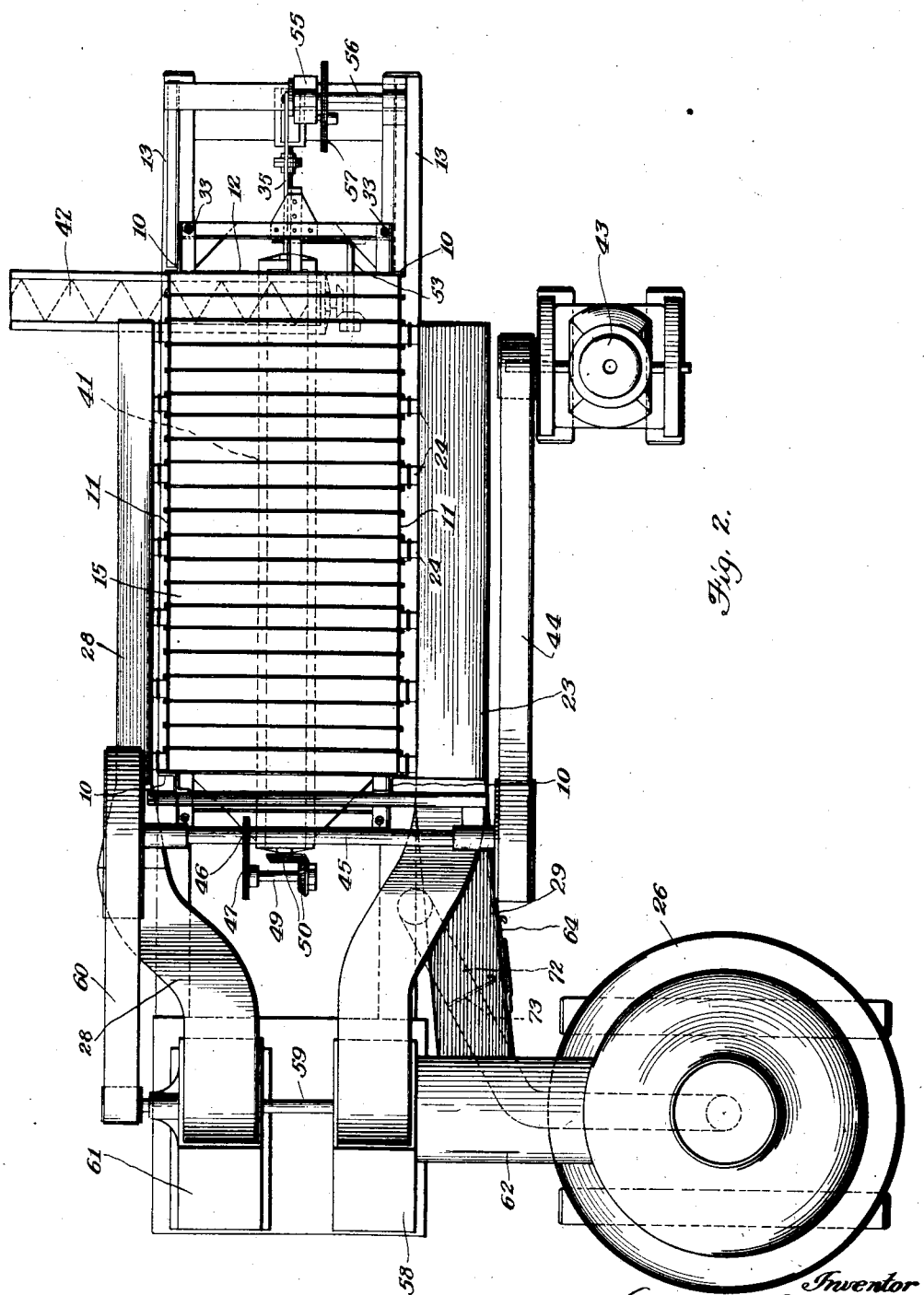
Figure 2 is a top plan view of the invention shown in Figure 1.

The air is supplied to the air duct 23 from a fan 58 having the rotary blades thereof mounted on a shaft 59. The shaft 59 is driven by a belt 60 extending downwardly from the drive shaft 45. A second fan 61 is operated by the shaft 59 and supplies cold air to the air duct 29. Air is supplied to the fan 58 from the hot air furnace 26 through a duct 62 which extends from the upper portion of the furnace to the intake of the fan, as shown in Figures 2 and 3. The return passage 29 for the air from the cooler enters the duct 62, as shown at 63 in Figure 3. By this arrangement, the heat absorbed from the grain by the cooling air is conserved and used for drying the grain in the drier. This air, being at a lower temperature than the air from the furnace, also serves to temper the air from the furnace to prevent application of excessive heat to the grain in the drier.

The air duct 29 is provided with an opening having an adjustable closure 64 by means of which air may be admitted from the atmosphere to further temper the air supplied by the hot air duct 23, if desired.

The furnace comprises a cylindrical cast iron chamber 65 having openings 66 near the bottom thereof for admitting air. Air may also be admitted to the interior of the furnace through a central tuyère 67. The heated air and products of combustion escape from the central chamber through openings 68 into a chamber 69 surrounding the central chamber 65 and provided with a flue or smoke stack 70. The heated air and products of combustion are drawn from the chamber 69 through the conduit 62 to the hot air fan. A damper 71 is provided in the flue 70 to control the escape of products of combustion. A pipe 72 connects the hot air conduit 23 with the tuyère 67 so that the fire within the furnace may be supplied with a forced draft of heated air, if desired. A cut-off 73 is provided for closing the conduit 72. It will be seen that the invention provides a drying and cooling plant in which the heated air is employed to effect drying of the grain within a minimum of space and with a minimum expenditure of heat, the heated air being passed through the grain a number of times to utilize the full drying capacity of the air and to thoroughly dry the grain. The heat imparted to the grain is conserved and the grain is properly cooled, ready for storing, by means of the cooler from which the air is returned to the drying apparatus.

In starting the device, the first grain would pass through the drier until the spaces 19 in the cooler were filled, if no means were provided to prevent this from occurring. For this reason, stop plates 75 are removably arranged in the spaces 19 in registration with the floor plates 21. These stop plates retain the first grain deposition in the spaces 19 until it has become dried after which the stop plates are removed to permit the dried grain to enter the cooler. This dried grain will retain the new grain entering the tops of the spaces 19 until it has been subjected to the drying currents.

It will be understood that various changes and alterations may be made from the particular embodiment shown and described without departing from the spirit and scope of the invention, as pointed out in the appended claims.

I claim:—

1. The combined grain drier and cooler comprising a chamber having upright perforated walls therein providing compartments for the passage of grain between said walls, said compartments being spaced from one another, solid partition walls arranged in the spaces between said compartments to divide said spaces into air chambers, a conduit for supplying heated air to said air chambers at points above the bottom of said chambers, staggered baffles in said air chambers for directing the heated air through said perforated walls and the grain in said grain compartments, a heater for supplying air to said hot air conduit, a cold air conduit for supplying air to the lower portions of said air chambers, baffles for directing the air supplied from said cold air conduit through the lower portions of said grain compartments, and a conduit for receiving air from said lower portions and directing said air into said hot air conduit.

2. A grain drier having an upright compartment, means for supplying grain to said compartment, a grain support disposed beneath the bottom of said compartment and spaced downwardly therefrom having openings for the escape of grain below the bottom of said compartment and above the top of said support, said support having a recess in the top thereof, and means for reciprocating said support to facilitate the escape of grain from the bottom of said compartment.

3. A grain drier comprising a chamber having upright compartments therein, means for supplying grain to the tops of said compartments, grain supports spaced downwardly from the bottoms of said compartments and having depressions therein, means for reciprocating said supports to facilitate escape of grain from the bottoms of said compartments, and means for adjusting the amplitude of reciprocation of said supports to control the speed or flow of grain through said compartments.

4. A grain drier comprising a chamber having upright perforated partition walls therein providing compartments, a hopper for supplying grain to the tops of said compartments, means for directing air through said partition walls and the grain in said compartments, grain supports spaced downwardly from the bottoms of said compartments having depressions therein, adjustable means for imparting reciprocation to said supports, and means for adjusting the distance between said supports and the bottoms of said compartments.

5. A grain drier comprising a chamber having upright perforated partition walls therein forming spaced grain compartments separated by air chambers, means for supplying heated air to the upper portions of said chambers, means for supplying cooling air to the lower portions of said chambers, baffles in said chambers for directing the air supplied thereto through said perforated walls and the grain in said compartments, a reciprocating frame, plates carried by said frame and disposed beneath said grain compartments, said plates having recesses therein for retaining small quantities of grain, means for reciprocating said frame to facilitate the flow of grain through said compartments, said reciprocating means being adjustable to vary the amplitude of reciprocation of said frame, and means for adjusting the height of said frame to regulate the distance between said plates and the bottoms of said compartments.

6. The combination with a drier, of a furnace for supplying heated air to said drier, said furnace comprising a fuel compartment, a casing enclosing an air space surrounding said compartment, there being openings for the discharge of air and products of combustion from said fuel compartment to said air space, a fan for withdrawing air from said air space and supplying said air to said drier, and means for directing air from said fan into said fuel compartment.

7. A combined drier and cooler having upright grain compartments provided with perforated walls, a hot air conduit for supplying air to the upper portions of said grain compartments, a fan for circulating air through said conduit, a heater for supplying air to said fan, a second conduit for supplying cooling air to the lower portions of said grain compartments, a fan for circulating air through said second conduit, and means for receiving the air from said second conduit after it has passed through the lower portions of said grain compartments and for directing the air received into said hot air conduit.

8. The combination with a drier, of a heater for supplying air to said drier, said heater comprising a fire chamber having a central tuyère, a casing surrounding said fire chamber and providing an air space about said chamber, there being openings for the passage of air from the upper portions of said chamber into said air space, a conduit for directing air and products of combustion from said air space to said drier, and a fan for circulating air through said conduit.

In testimony whereof I have signed my name to this specification on this 13th day of February, A. D. 1926.

GEORGE E. CHAMBERLAIN.